United States Patent Office 3,614,852
Patented Oct. 26, 1971

3,614,852
SHRINK PACKAGING
Konrad Buob, Rho, Milan, Italy, assignor to W. R. Grace & Co., New York, N.Y.
No Drawing. Filed May 9, 1967, Ser. No. 637,068
Claims priority, application Great Britain, May 11, 1966, 20,975/66
Int. Cl. B32b 27/30; B65b 43/00
U.S. Cl. 53—30                                                        4 Claims

ABSTRACT OF THE DISCLOSURE

The invention relates to the use in shrink packaging of a moderately oriented film of a vinyl chloride polymer which has a shrinkage of at most 35% at 100° C. in both directions and a shrink tension less than 10.5 kg./cm.$^2$.

---

This invention relates to improvements in shrink packaging.

In the process conventionally known as shrink packaging, the object to be packaged is surrounded by a substantially pre-oriented shrinkable film which is then sealed about the object and shrunk by exposure to heat. Because of their ready availability and other valuable properties it would be desirable to use films of vinyl chloride polymers, in particular polyvinyl chloride (PVC) in shrink packaging. However, the known oriented PVC films are unsatisfactory for this purpose. Oriented rigid (i.e. unplasticised) PVC films have excessively high shrink tension to an extent such that overlapping folds of a wrapper cannot be properly heat sealed on conventional equipment without distortion and formation of holes; furthermore when the film is used to package an object of relatively low mechanical strength the high shrink tension results in deformation of the object. When a plasticiser is incorporated in the PVC the shrink tension is reduced, but the amounts of plasticiser required to reduce the shrink tension to acceptable levels are such that the glass transition temperature of the polymer is generally reduced to a level such that the films are not dimensionally stable at room temperaure; thus oriented plasticised PVC films having a plasticiser level of more than 20% are not dimensionally stable at room temperature. Furthermore, the presence of plasticiser has a detrimental effect on the desirable low oxygen and moisture vapour transmission rate of polyvinyl chloride. In many countries the application of plasticised films in the field of food packaging is limited to non-fatty goods as the plasticiser tends to migrate into fat-containing items. An additional disadvantage of oriented plasticised PVC films is their reduced rigidity. This reduction in rigidity is especially pronounced at plasticiser levels of more than 15%. It is therefore impossible to use these films on high speed packaging machines where stiffness is required.

The object of the present invention is to provide an improved process for shrink packaging wherein the valuable properties of vinyl chloride polymer films are utilised but the disadvantages referred to above are substantially reduced or eliminated. A further object of the invention is to provide a novel film which is particularly useful in shrink packaging.

It has now surprisingly been discovered that moderately oriented vinyl chloride polymer films are very satisfactory for use in shrink packaging. Accordingly the present invention provides a process for packaging an object by surrounding the object by a pre-oriented shrinkable film, sealing the film about the object and shrinking the film by exposure to heat wherein there is used as the shrinkable film an oriented film of a vinyl chloride polymer (as hereinafter defined) which has a Young's modulus of elasticity in both directions of at least 200,000 p.s.i. (14,000 kg./cm.$^2$) at 23° C., a shrinkage of at most 35% at 100° C. in both directions and a shrink tension less than 150 p.s.i. (10.5 kg./cm.$^2$) at any temperature. The films preferably have shrink tensions not exceeding 100 p.s.i. (7 kg./cm.$^2$) at any temperature. The most preferred film is a rigid (i.e. unplasticised) polyvinyl chloride film which is 0.01 to 0.05 mm. thick and has been biaxially oriented so that it has a shrinkage in both directions of at most about 20%, especially 15 to 20%, e.g. about 20%.

The shrinkages referred to in this specification are measured as follows. A square piece of film (10 cm. by 10 cm.) is immersed in water at 98° C. for 4 seconds; it is then immersed in water at room temperature; after drying, the reduction in width and length is measured and expressed as a percentage of the original dimensions. The shrink tensions referred to in this specification are measured as follows. A strip of film is placed between two clamps, one of which is attached to a force-sensing device, and a thermocouple is fixed close to the strip; the strip is exposed to a stream of air at increasing temperatures, the force measured by the force-sensing device is plotted against the temperature measured by the thermocouple; the shrink tension is the maximum force divided by the cross-section of the strip.

Films having low degrees of orientation or shrink in one direction only, such as are produced directly by some extrusion methods, can be used in accordance with the invention, but require the use of rather high film temperatures, near the melting point of the polymer, in order sufficiently to shrink the film. This has obvious disadvantages, particularly when temperature-sensitive articles are to be packaged. Accordingly it is preferred to use films which have been biaxially oriented so that they have percent shrinkages at 100° C. in both directions of 5 to 35%, especially 15 to 25%, particularly 15 to 20%, and have shrink tensions not exceeding 150 p.s.i. (10.5 kg./cm.$^2$) and preferably not exceeding 100 p.s.i. (7.0 kg./cm.$^2$) at any temperature; such films are believed to be novel. They can be very satisfactorily used in shrink packaging procedures in which the film only has to reach a maximum temperature of 120° C. and for regular objects 100° C. or even less.

The vinyl chloride polymer films should be rigid (i.e. contain no plasticiser) or should be at most lightly plasticized, e.g. with ester type plasticizers, but in any case have a modulus of elasticity at 23° C. not lower than 200,000 p.s.i. (14,000 kg./cm.$^2$). They are preferably 0.4 to 2.0 mils (0.01 to 0.05 mm.) thick. Such shrinkable films can be made for example by tubular extrusion with subsequent hot blowing, provided that the necessary measures are taken to impart the desired molecular orientation.

For example, PVC films to be used according to the invention may be made by a method which comprises the extrusion of a polyvinyl chloride melt through a crosshead annular die, inflating the resulting tube to form a bubble whose diameter is three times the diameter of the annular die, and afterwards laying the resulting film flat by means of converging surfaces or idler rollers. When the melt exits from the die, cold air is blown concentrically against the tube in order to stabilise the bubble and to cool it down while it is still in the non- or partially expanded state, to secure the desired degree of biaxial molecular orientation after further expansion and cooling. The degree of orientation, and hence the shrink and shrink tension, which is obtained by this type of "controlled hot blown operation" is substantially lower than that of a film produced in the conventional manner of orientation of PVC at temperatures slightly above the second order transition temperature and appreciably higher than that obtained by the normal process without "controlled bubble cooling." Depending on the amount and temperature of the air impinging on the bubble, and the extrusion rate and expansion ratio of the bubble, it is possible to obtain shrink values up to 30% at 100° C. in both the longitudinal and transverse directions, and shrink tensions not higher than 150 p.s.i. (10.5 kg./cm.$^2$) at any temperature in both directions. This film furthermore has the advantage of improved impact strength compared to that of normal hot blown film. Any other method of extruding and expanding a molten tube exiting from an annular die, e.g. by pulling the tube over one or several mandrels kept at controlled temperatures and thereby imparting molecular orientation, can be applied, but the arrangement must be such that it results in film with shrink and shrink tension values as outlined above.

The term "vinyl chloride polymer" is used herein to include homopolymers of vinyl chloride, which are preferred, and also copolymers of vinyl chloride with copolymerisable monomers, e.g. copolymers of vinyl chloride and vinyl acetate, styrene, acrylonitrile, dialkyl fumarate or maleate or an alkyl acrylate or methacrylate, and copolymers of vinyl chloride, methyl methacrylate, vinyl acetate and vinylidene chloride. Furthermore, blends of polyvinyl chloride, e.g. with chlorinated polyethylene or ABS terpolymer or an acrylate or methacrylate polymer can be used.

The vinyl chloride polymers are preferably stabilised with known compounds, e.g. organo tin compounds, barium cadmium salts and calcium zinc salts, and lubricants are preferably incorporated to aid the passage of the polymer melt through the extruder.

The use of vinyl chloride polymer films as described above in shrink packaging produces particularly good results in the shrink packaging of essentially regularly shaped products by known techniques, such as the trim-seal technique, in which a wrapper disposed around a product is sealed and severed simultaneously by a hot wire, or the side-folding technique in which a wrapper disposed around the product is folded and the flaps sealed by heated plates. The subsequent shrinking of the sealed wrappers may be accomplished by the well known techniques of passing the package through hot air tunnels or in between an arrangement of infrared heat sources.

The use of PVC films as described surprisingly results in a highly satisfactory appearance of the finished package. The shrink tension of the films is low enough to allow tight seals to be made without distortions or hole formation and eliminates the danger of crushing or deforming the package.

EXAMPLE 1

Homopolymer vinyl chloride of the suspension type, having a K value of 60, is dry blended with 2.0 parts of a commercial tin-containing stabiliser and 1.5 parts of a commercial lubricant. The extrusion takes place with a 2½ inch (6.85 cm.) diameter single screw extruder connected to a crosshead die of 7 inch (17.8 cm.) diameter having a gap of 0.8 mm. The extruder and die temperatures are adjusted so that the melt at the exit of the die has a temperature of 205° C. Air is passed through the die into the exiting molten tube to inflate the tube to a diameter of 21.3 inch (54.1 cm.). The tube is circumferentially cooled at the exit of the die by blowing air against it at a rate of 300 m.$^3$/hr. at a temperature of 25° C. The expanded cooled tube is laid flat by two converging sets of rollers and passes through a pair of pinch rolls whose speed is 28 m./min. The resulting film has a final thickness of 0.025 mm. and has a shrink at 100° C. of 15% in both the longitudinal and transverse directions. The shrink tension of this film does not exceed at any temperature 50 p.s.i. (3.5 kg./cm.$^2$). Boxes were packaged with this film, which had previously been coated with an antistatic agent based on a quaternary ammonium salt, on a Forgrove LFA machine adapted to seal the folds of thermoplastic films. The sealed packages were shrunk in a hot air tunnel adjusted to obtain a film temperature of 98° C. and it was found that a very satisfactory shrinkage with a dwelling time of the package in the tunnel of 4 secs. was obtained.

EXAMPLE 2

Non-plasticised PVC film produced essentially in the same manner as described in Example 1, except for circumferentially cooling the tubing at the die exit with air at a lower temperature (10° C.) produced a film with 21% shrink at 100° C. in both directions and with a shrink tension not exceeding 90 p.s.i. (6.3 kg./cm.$^2$) at any temperature. This film was used for the packaging of jacketed records by the trim-seal technique. The wrappers were shrunk in a hot air tunnel adjusted to obtain a film temperature of 115° C. A dwelling time in this tunnel of 3 secs. gave a tight cling of the film to the cardboard record jackets.

I claim:

1. In a process for packaging an object by surrounding the object by a pre-oriented shrinkable film, heat-sealing the film to itself about the object and shrinking the film by exposure to heat, the improvement which consists in using as the shrinkable film an oriented film of a vinyl chloride polymer, which film has a modulus of elasticity in both directions of at least 200,000 p.s.i. at 23° C., a shrinkage of at most 35% at 100° C. in both directions, a shrink tension less than 150 p.s.i. at any temperature, and is free from plasticiser.

2. Process according to claim 1 wherein the film has a shrinkage of 5 to 35% at 100° C. in each direction and is 0.4 to 2.0 mils thick.

3. Process according to claim 2 wherein the film has a shrinkage of 15 to 25% at 100° C. in each direction.

4. Process according to claim 2 wherein the film has a shrink tension less than 100 p.s.i. at any temperature.

References Cited

UNITED STATES PATENTS

| 2,067,025 | 1/1937 | Schmidt | 161—402 X |
| 2,890,552 | 6/1959 | Henderson | 53—30 |
| 3,126,682 | 3/1964 | Krance | 53—30 |
| 3,134,210 | 5/1964 | Dreyfus | 53—30 |
| 3,161,999 | 12/1964 | Klusmire | 53—30 |
| 3,424,833 | 1/1969 | Mazzolini et al. | 264—168 |
| 3,347,365 | 10/1967 | Funkhouser | 53—30 X |

OTHER REFERENCES

Modern Packaging Encyclopedia 1966, vol. 39, No. 4A, McGraw-Hill, Inc., New York, pp. 256–261.

JOHN T. GOOLKASIAN, Primary Examiner

G. W. MOXON II, Assistant Examiner

U.S. Cl. X.R.

161—165, 402, 411